(12) United States Patent
Zhang et al.

(10) Patent No.: US 10,711,490 B2
(45) Date of Patent: Jul. 14, 2020

(54) ONE-SIDE ROTATING ARC LOCK

(71) Applicant: SHENZHEN GLOSHINE TECHNOLOGY CO., LTD., Shenzhen, Guangdong (CN)

(72) Inventors: Yongjun Zhang, Guangdong (CN); Guoqiang Li, Guangdong (CN); Zhiqiang Gao, Guangdong (CN)

(73) Assignee: SHENZHEN GLOSHINE TECHNOLOGY CO., LTD., Shenzhen (CN)

( * ) Notice: Subject to any disclaimer, the term of this patent is extended or adjusted under 35 U.S.C. 154(b) by 24 days.

(21) Appl. No.: 16/012,730

(22) Filed: Jun. 19, 2018

(65) Prior Publication Data
US 2018/0328082 A1    Nov. 15, 2018

Related U.S. Application Data

(63) Continuation of application No. PCT/CN2018/082590, filed on Apr. 11, 2018.

(30) Foreign Application Priority Data

May 12, 2017   (CN) .......................... 2017 1 0334337

(51) Int. Cl.
*E05B 63/00* (2006.01)
*E05B 9/00* (2006.01)
(Continued)

(52) U.S. Cl.
CPC ............ *E05B 63/0056* (2013.01); *E05B 9/00* (2013.01); *F16B 2/185* (2013.01); *F16B 5/0092* (2013.01);
(Continued)

(58) Field of Classification Search
CPC .......... Y10T 292/0863; Y10T 292/0864; Y10T 292/0867; Y10T 292/0868;
(Continued)

(56) References Cited

U.S. PATENT DOCUMENTS 538,078 A * 4/1895 Kerler ................. E05B 65/0007
292/213
1,036,346 A * 8/1912 Schmittberger ........ E05B 83/16
70/141
(Continued)

FOREIGN PATENT DOCUMENTS

CN       101803349 A     8/2010
CN       204533998 U  *  8/2015
(Continued)

OTHER PUBLICATIONS

Written Opinion of the International Searching Authority of PCT Patent Application No. PCT/CN2018/082590 dated Jun. 27, 2018.

*Primary Examiner* — Kristina R Fulton
*Assistant Examiner* — Faria F Ahmad

(57) ABSTRACT

The present invention discloses a one-side rotating arc lock which comprises an adjusting assembly arranged on a first shell and a strainer arranged on a second shell. The adjusting assembly comprises an arc adjuster rotatably connected with the first shell. The arc adjuster is provided with multiple protrusions in the circumferential direction, used for adjusting the angle between the first and the second shell. Groove is provided on the protrusion. The strainer comprises an adjusting rod which matches the groove for locking the first and the second shell. The angle between the first and the second shell is adjusted through the arc adjuster rotatably connected with the first shell, and locking of the first and the second shell is achieved through the strainer. The one-side rotating arc lock of the preset invention not only has a simple
(Continued)

structure and easy to operate, but also facilitates adjustment of the angle.

6 Claims, 8 Drawing Sheets

(51) Int. Cl.
| | | |
|---|---|---|
| *H04M 1/02* | (2006.01) | |
| *G09F 9/307* | (2006.01) | |
| *F16B 2/18* | (2006.01) | |
| *F16B 5/06* | (2006.01) | |
| *F16B 5/00* | (2006.01) | |

(52) U.S. Cl.
CPC .......... *F16B 5/0614* (2013.01); *F16B 5/0628* (2013.01); *G09F 9/307* (2013.01); *H04M 1/0222* (2013.01); *Y10T 292/089* (2015.04); *Y10T 292/0863* (2015.04); *Y10T 292/0864* (2015.04); *Y10T 292/0867* (2015.04); *Y10T 292/0868* (2015.04); *Y10T 292/0886* (2015.04); *Y10T 292/0887* (2015.04); *Y10T 292/0891* (2015.04); *Y10T 292/0893* (2015.04); *Y10T 292/57* (2015.04); *Y10T 292/68* (2015.04); *Y10T 292/696* (2015.04); *Y10T 292/702* (2015.04); *Y10T 292/705* (2015.04)

(58) Field of Classification Search
CPC ......... Y10T 292/0869; Y10T 292/0886; Y10T 292/0887; Y10T 292/089; Y10T 292/68; Y10T 292/705; Y10T 292/696; Y10T 292/702; Y10T 292/57; Y10T 292/0893; Y10T 292/0891; F16B 5/0092; F16B 5/0614; F16B 5/0628; G09F 13/0413; G09F 9/3026; G09F 9/33; G09F 9/32; G09F 2300/04
See application file for complete search history.

(56) References Cited

U.S. PATENT DOCUMENTS

| | | | | |
|---|---|---|---|---|
| 1,321,214 | A * | 11/1919 | Karasevicz | E05C 5/00 292/67 |
| 1,573,866 | A * | 2/1926 | Rogers | E05B 65/0817 292/113 |
| 1,653,487 | A * | 12/1927 | White | E05B 63/125 70/128 |
| 1,691,750 | A * | 11/1928 | Alley | E05C 3/165 70/150 |
| 1,902,628 | A * | 3/1933 | Endter | E05C 3/36 292/213 |
| 2,036,151 | A * | 3/1936 | Lang | E05F 11/00 292/112 |
| 2,156,004 | A * | 4/1939 | Vanderlinde | E05B 85/24 292/192 |
| 2,159,940 | A * | 5/1939 | Endter | E05C 3/36 292/192 |
| 2,507,140 | A * | 5/1950 | Bule | B60T 11/105 477/196 |
| 3,514,142 | A * | 5/1970 | Smith | E05B 13/002 292/113 |
| 3,553,984 | A * | 1/1971 | Grumbach | E05B 3/006 70/99 |
| 3,572,065 | A * | 3/1971 | Peters | E05B 81/22 70/156 |
| 3,572,066 | A * | 3/1971 | Peters | E05B 83/16 70/156 |
| 3,608,939 | A * | 9/1971 | McBurnie | E05B 63/248 292/254 |
| 3,877,262 | A * | 4/1975 | Williams | E05B 65/1073 70/92 |
| 4,458,928 | A * | 7/1984 | Hirschbein | E05B 65/1046 292/216 |
| 4,524,590 | A * | 6/1985 | Budish | E05C 7/02 292/142 |
| 4,682,800 | A * | 7/1987 | Lovelace, Jr. | E05C 19/145 292/247 |
| 4,796,932 | A * | 1/1989 | Tame | E05B 81/20 292/112 |
| 4,824,150 | A * | 4/1989 | Smith | E05B 65/104 292/279 |
| 5,437,173 | A * | 8/1995 | Spinar | E05B 17/0029 200/574 |
| 5,437,485 | A * | 8/1995 | Goldschmidt | E05B 15/0053 292/142 |
| 5,452,925 | A * | 9/1995 | Huang | E05B 65/0817 292/57 |
| 6,189,939 | B1 * | 2/2001 | Zehrung | E05B 65/1053 292/21 |
| 6,951,318 | B1 * | 10/2005 | Petersen | E02D 29/1427 220/315 |
| 7,399,008 | B2 * | 7/2008 | Leopold | B60R 7/04 292/238 |
| 2010/0132262 | A1 * | 6/2010 | Talpe | E05B 65/1006 49/394 |
| 2019/0012955 | A1 * | 1/2019 | Xu | G09G 3/32 |
| 2019/0013772 | A1 * | 1/2019 | Bamat | H02S 20/23 |
| 2019/0024688 | A1 * | 1/2019 | Friszell | F16B 5/0291 |
| 2019/0219081 | A1 * | 7/2019 | Hagedorn | B60P 7/08 |

FOREIGN PATENT DOCUMENTS

| | | |
|---|---|---|
| CN | 205582404 U | 9/2016 |
| CN | 106782127 A * | 5/2017 |
| CN | 107435789 A * | 12/2017 |

* cited by examiner

US 10,711,490 B2

ONE-SIDE ROTATING ARC LOCK

CROSS REFERENCES TO RELATED APPLICATIONS

This application is a continuation application of PCT Application No. PCT/CN2018/082590 filed on Apr. 11, 2018, which claims the benefit of Chinese Patent Application No. 201710334337.X filed on May 12, 2017. The entire contents of the above applications are hereby incorporated by reference in their entirety.

FIELD OF THE INVENTION

The present invention relates to the technical field of connecting components, in particular to a one-side rotating arc lock.

BACKGROUND OF THE INVENTION

The arc lock in the prior art has a complex structure and is very difficult to maintain. It has a high requirement for the surface in vertical, and the angle is not easy to adjust. Therefore, it is necessary to develop an arc lock that facilitates adjustment of the angle.

SUMMARY OF THE INVENTION

The purpose of the present invention is to provide a one-side rotating arc lock, which has a simple structure, easy to operate, and facilitates adjustment of the angle.

To achieve this goal, the present invention adopts the following technical solutions:

A one-side rotating arc lock which comprises an adjusting assembly arranged on a first shell and a strainer arranged on a second shell. The adjusting assembly comprises an arc adjuster rotatably connected with the first shell. The arc adjuster is provided with multiple protrusions in the circumferential direction, which are used for adjusting the angle between the first shell and the second shell. Groove is provided on the protrusion. The strainer comprises an adjusting rod which matches the groove for locking the first shell and the second shell.

Wherein, the number of the protrusions is nine, the nine protrusions are uniformly arranged along the circumferential direction of the arc adjuster, and the radial lengths of the nine protrusions gradually increase along the circumferential direction of the arc adjuster.

Wherein, the arc adjuster is rotatably connected with the first shell through a rotating shaft, and the rotating shaft is sleeved with bearings on both upper and lower ends of the arc adjuster.

Wherein, the first shell is provided with a receiving groove for mounting the arc adjuster, and an upper part of the receiving groove is provided with a cover plate.

Wherein, the rotating shaft is provided at an upper part of the cover plate with a first knob for adjusting the rotation angle of the arc adjuster and a nut for fixing the first knob.

Wherein, one end of the adjusting rod is provided with a chuck, and the other end of the adjusting rod is provided with a second knob; when locking, press the second knob so that the chuck passes through the groove, rotating the second knob so that the chuck and the groove are alternately arranged to lock the arc adjuster. When unlocking, rotates the second knob so that the chuck is disposed parallel to the groove, and the second knob moves outwards so that the chuck is released from the groove to unlock the arc adjuster.

Wherein, the strainer further comprises a fixing seat fixedly connected with the second shell and a handle screwed with the fixing seat; When locking, rotate the handle so that the handle moves outward relative to the fixing seat until the handle is against the second knob to tighten the adjusting rod and lock the arc adjuster; When unlocking, rotate the handle in the opposite direction, so that the handle moves inward relative to the fixing seat until the handle is separated from the second knob to release the adjusting rod, thereby unlocking the arc adjuster.

Wherein, a spring is sleeved on the adjusting rod, and both ends of the spring are respectively abutted with the second knob and the handle.

The beneficial effects of the present invention: The one-side rotating arc lock of the present invention realizes the adjustment of the angle between the first shell and the second shell through the arc adjuster rotatably connected with the first shell, and realizes locking of the first shell and the second shell through the strainer. The one-side rotating arc lock of the present invention has a simple structure and is easy to operate, also facilitates adjustment of the angle between two surfaces.

Figure 1:
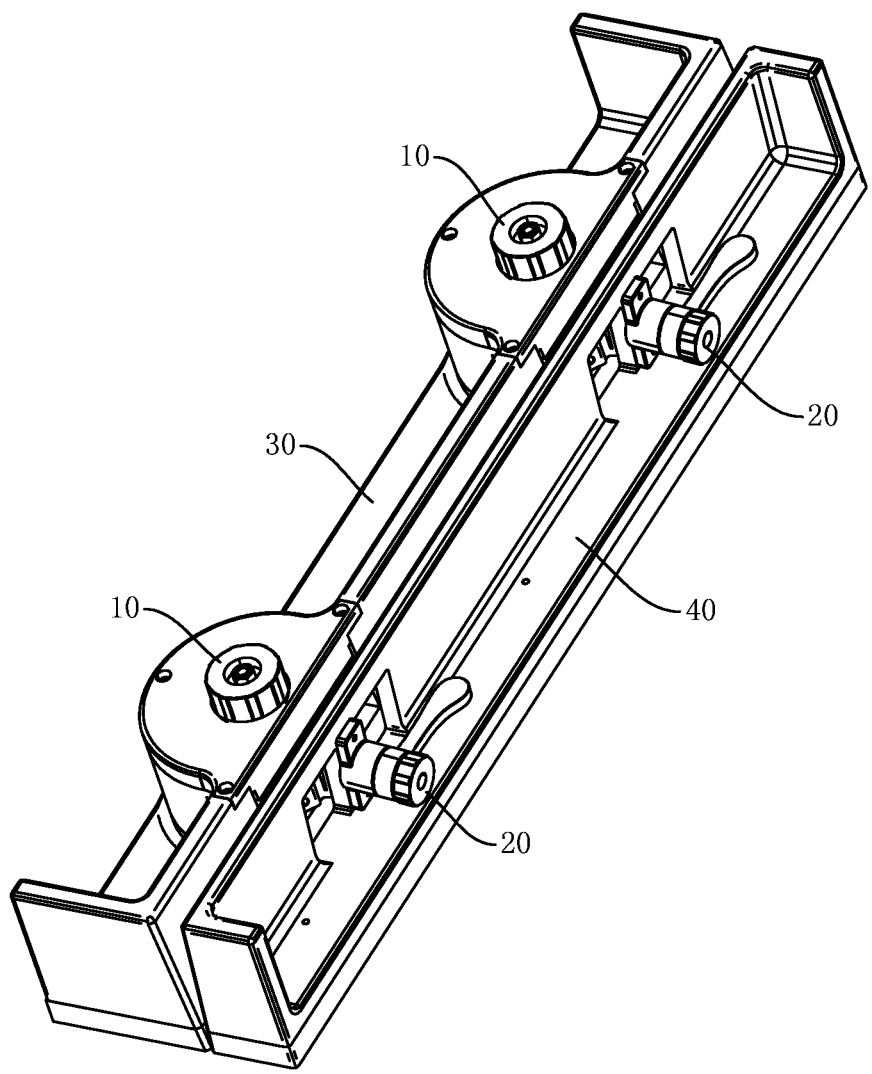
FIG. 1 is a schematic diagram of installation of a one-side rotating arc lock provided by an embodiment of the present invention.

The reference signs in the drawings are as follows:
10: adjusting assembly; 11: arc adjuster; 111: protrusions; 112: groove; 12: rotating shaft; 13: bearing; 14: cover plate; 15: first knob; 16: nut; 20: strainer; 21: adjusting rod; 211:

chuck; 22: second knob; 23: fixing seat; 24: handle; 25: spring; 30: first shell; 31: receiving groove; 40: second shell.

DETAILED DESCRIPTION OF THE PREFERRED EMBODIMENT

The technical solution of the present invention will be further described below with reference to FIGS. 1 to 14 and through specific embodiments.

Figure 2:
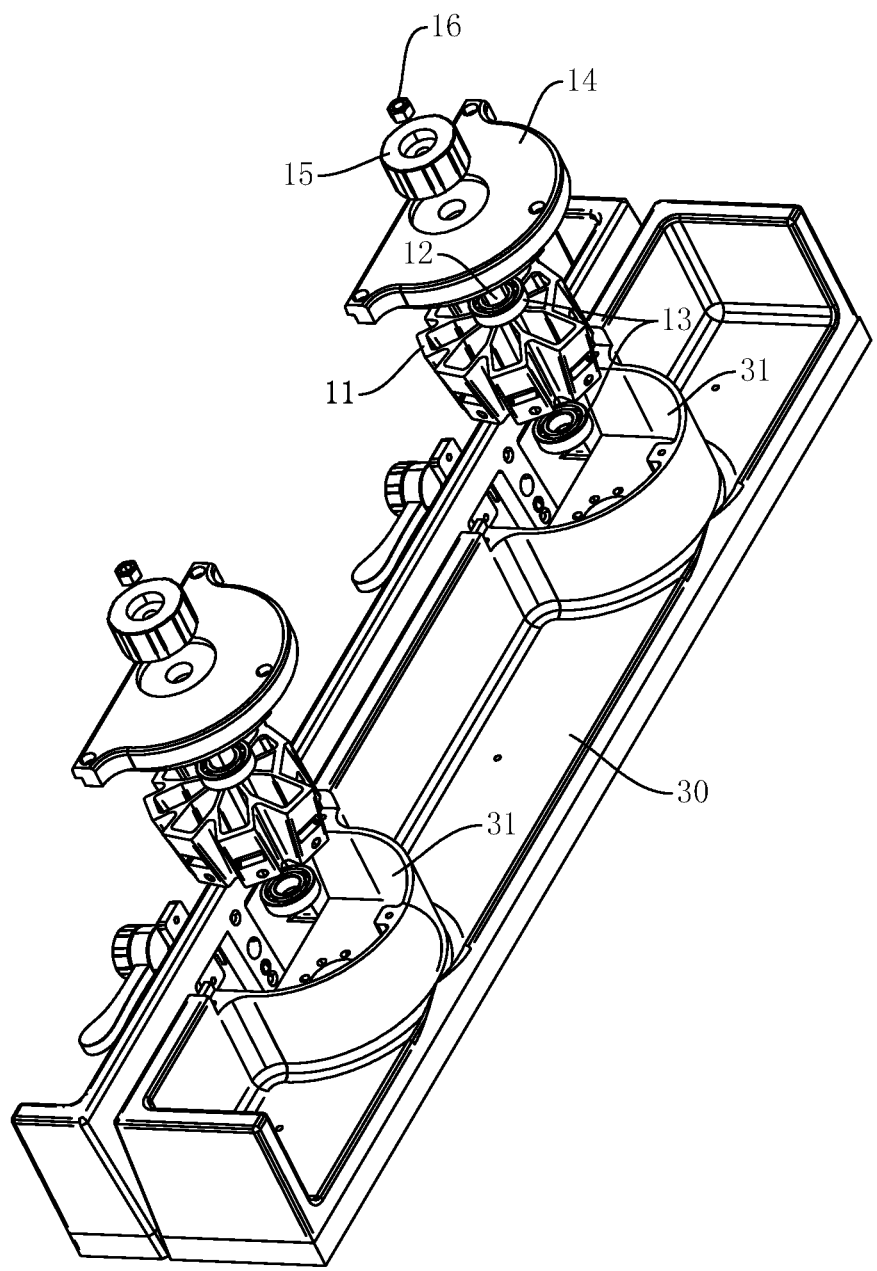
FIG. 2 is a schematic exploded perspective view I of a one-side rotating arc lock provided by an embodiment of the present invention.
Figure 3:
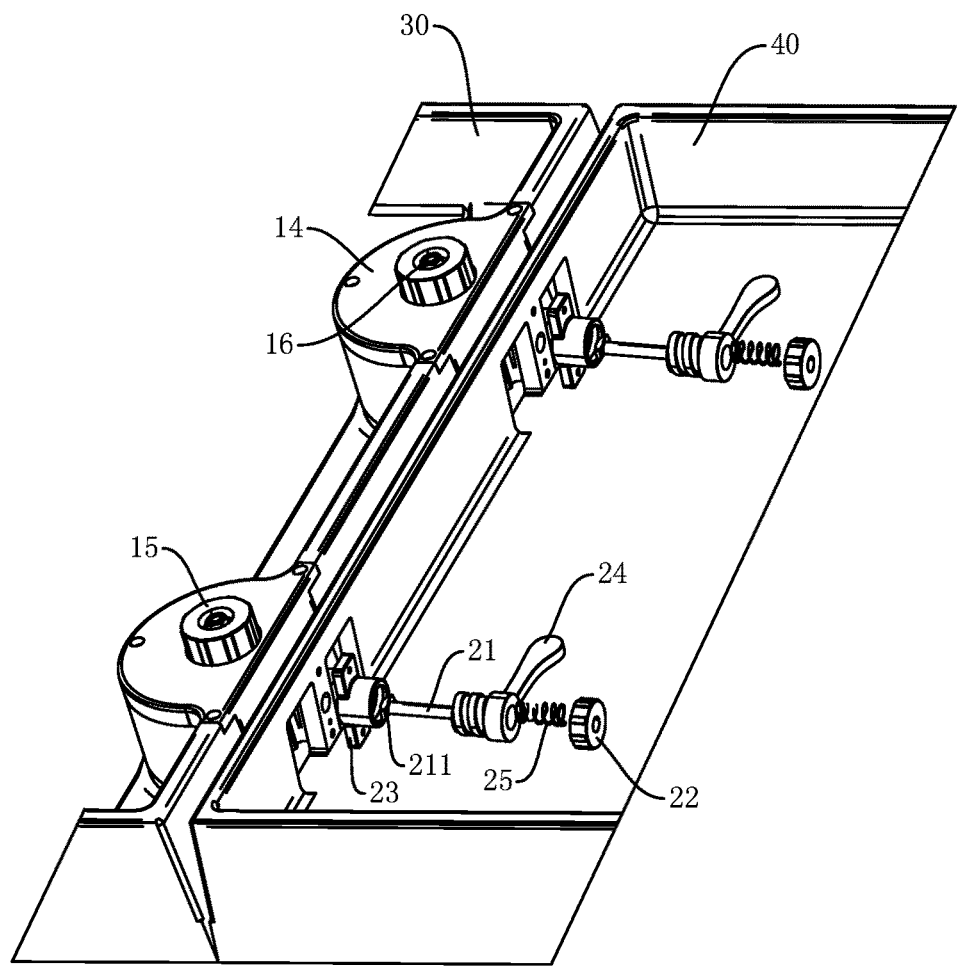
FIG. 3 is a schematic exploded perspective view II of a one-side rotating arc lock provided by an embodiment of the present invention.
Figure 4:
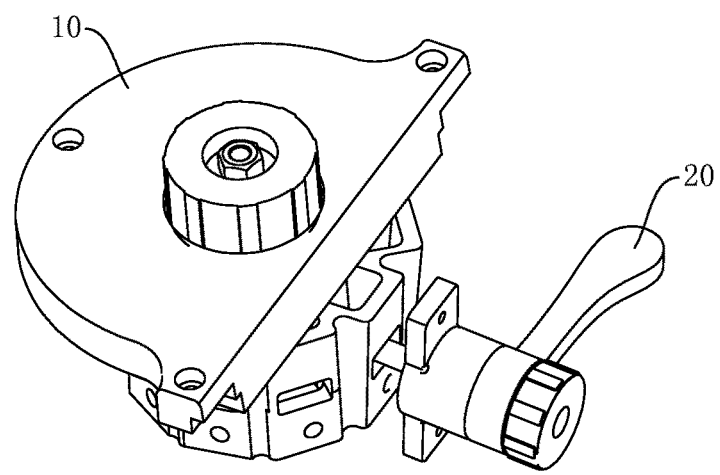
FIG. 4 is a three-dimensional structural schematic diagram of a one-side rotating arc lock provided by an embodiment of the present invention.
Figure 5:
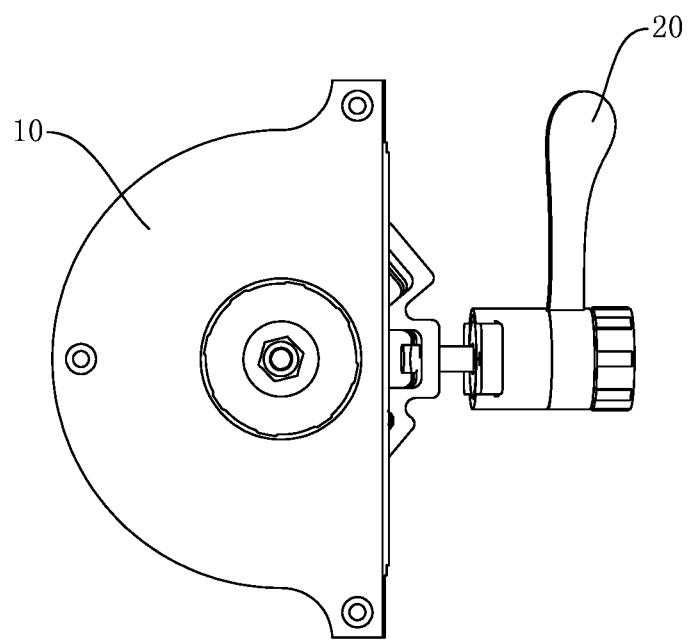
FIG. 5 is a top view of a one-side rotating arc lock provided by an embodiment of the present invention.
Figure 6:
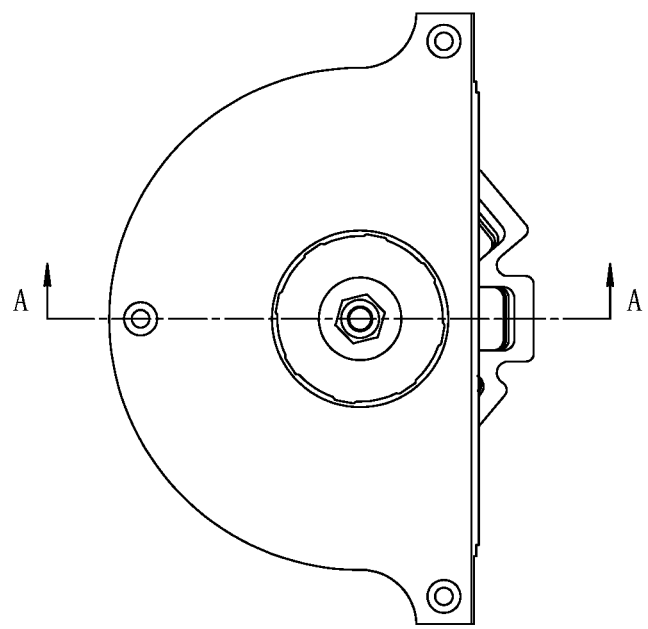
FIG. 6 is a top view of an adjusting assembly provided by an embodiment of the present invention.
Figure 7:
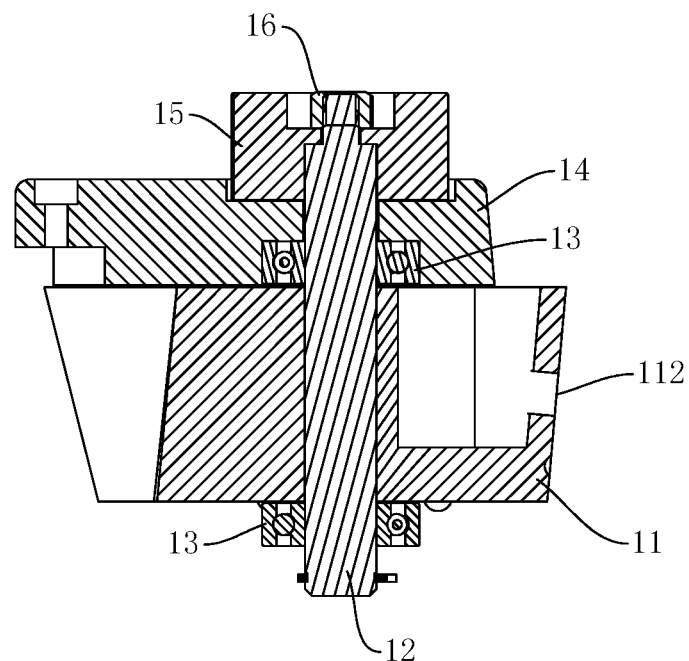
FIG. 7 is a sectional view taken along line AA in FIG. 6.

As shown in FIGS. 1 to 7, a one-side rotating arc lock, which comprises an adjusting assembly 10 arranged on a first shell 30 and a strainer 20 arranged on a second shell 40. As shown in FIG. 2, FIG. 6 and FIG. 7, the adjusting assembly 10 comprises an arc adjuster 11 rotatably connected with the first shell 30. The arc adjuster 11 is provided with multiple protrusions 111 along its circumferential direction, for adjusting the angle between the first shell 30 and the second shell 40, a protrusion 111 is provided with a groove 112. As shown in FIG. 3, the strainer 20 comprises an adjusting rod 21 that cooperates with the groove 112 to lock the first shell 30 and the second shell 40.

The adjustment of the angle between the first shell 30 and the second shell 40 is achieved by the arc adjuster 11 which is rotatably connected with the first shell 30, and the locking of the first shell 30 and the second shell 40 is realized by the strainer 20. The structure is simple, the operation is convenient, and it is easy to adjust the angle.

Figure 8:
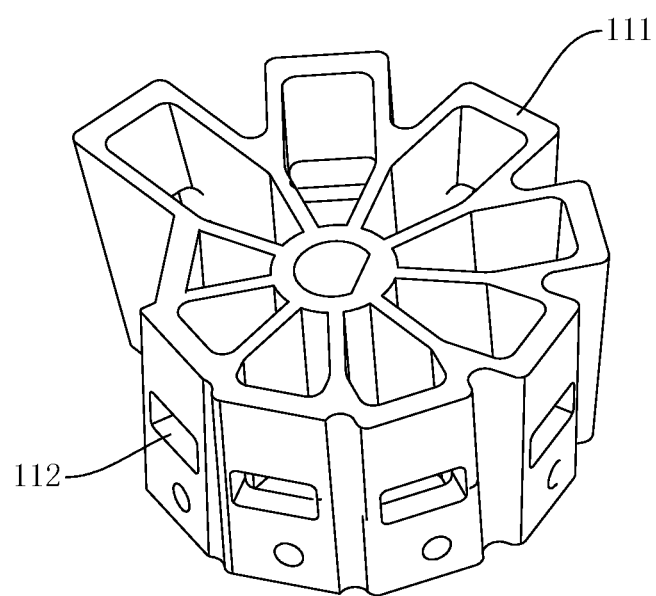
FIG. 8 is a three-dimensional structural schematic diagram of an arc adjuster provided by an embodiment of the present invention.
Figure 9:
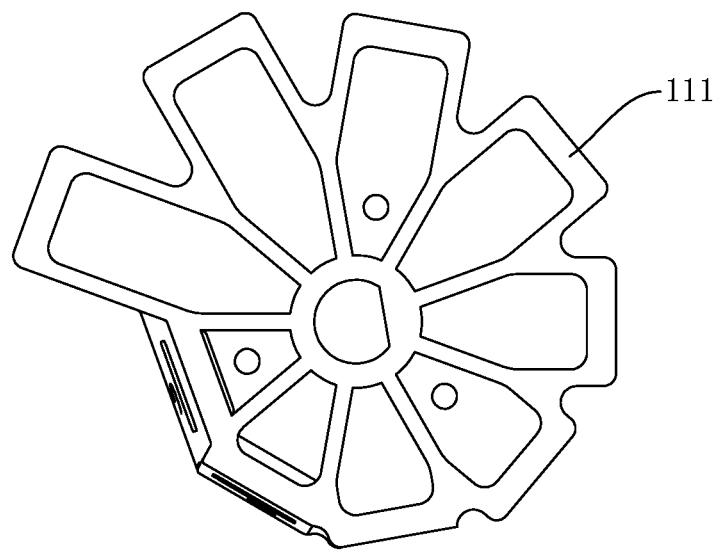
FIG. 9 is a top view of an arc adjuster provided by an embodiment of the present invention.
Figure 12:
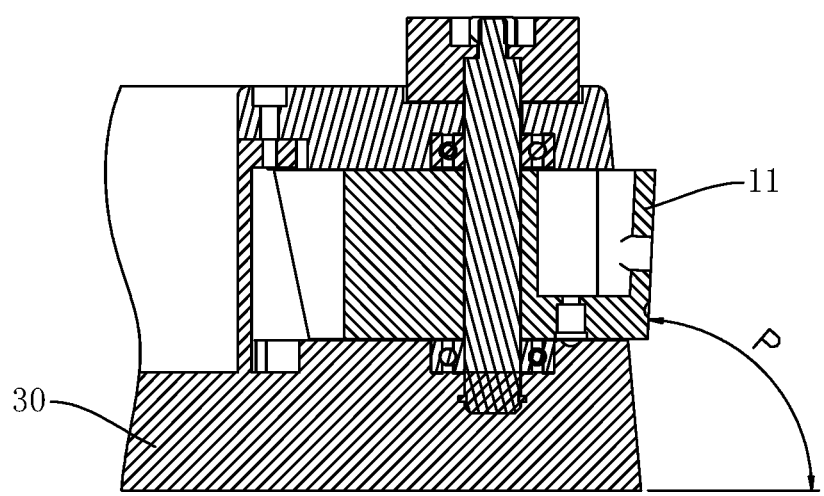
FIG. 12 is a schematic diagram I of an angle adjustment state of an adjusting assembly provided by an embodiment of the present invention.
Figure 13:
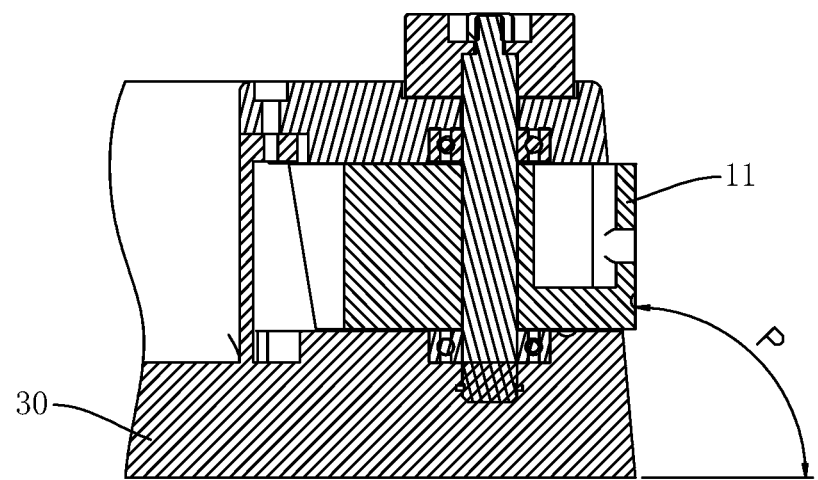
FIG. 13 is a schematic diagram II of an angle adjustment state of an adjusting assembly provided by an embodiment of the present invention.
Figure 14:
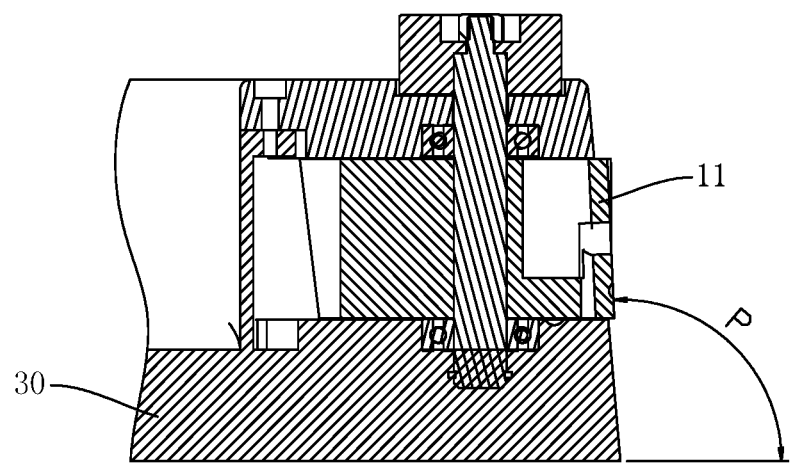
FIG. 14 is a schematic diagram III of an angle adjustment state of an adjusting assembly provided by an embodiment of the present invention.

In one embodiment, as shown in FIG. 8 and FIG. 9, the number of the protrusions 111 is nine, and the nine protrusions 111 are uniformly arranged along the circumferential direction of the arc adjuster 11, and the radial lengths of the nine protrusions 111 gradually increases along the circumferential direction of the arc adjuster, so that with every turn of the protrusion 111 of the arc adjuster 11, the angle between the first shell 30 and the second shell 40 is adjusted at a rotation angle of 2.5°. As shown in FIGS. 12 to 14, the angle between the end surface of the arc adjuster and the bottom surface of the first shell is defined as P, P in FIG. 12 is 87.5°, P in FIG. 13 is 90°, and P in FIG. 14 is 92.5°.

In one embodiment, the arc adjuster 11 is rotatably connected with the first shell 30 through a rotating shaft 12. The rotating shaft 12 is sleeved with bearings 13 on both upper and lower ends of the arc adjuster 11. The arrangement of the bearing 13 can reduce the frictional force during the rotation of the arc adjuster 11, so that the arc adjuster 11 can rotate more smoothly.

In one embodiment, the first shell 30 is provided with a receiving groove 31 for mounting the arc adjuster 11, and an upper portion of the receiving groove 31 is provided with a cover plate 14. The cover plate 14 and the receiving groove 31 cooperate to form a cavity, and the arc adjuster 11 is sealed in the cavity so as to protect the arc adjuster 11.

In one embodiment, the rotating shaft 12 is provided at an upper part of the cover plate 14 with a first knob 15 for adjusting the rotation angle of the arc adjuster 11 and a nut 16 for fixing the first knob 15. Preferably, the first knob 15 and the arc adjuster 11 are both fixed on the rotating shaft 12. When the first knob 15 is rotated, the rotation of the arc adjuster 11 can be realized. The disposition of the nut 16 acts as a limit to the first knob 15 and prevents the first knob 15 from being disengaged from the rotating shaft 12.

In one embodiment, an end of the adjusting rod 21 is provided with a chuck 211, and the other end of the adjusting rod 21 is provided with a second knob 22. When locking, the second knob 22 is pressed so that the chuck 211 passes through the groove 112, the second knob 22 is rotated so that the chuck 211 and the groove 112 are alternately arranged to lock the arc adjuster 11. When unlocking, the second knob 22 is rotated so that the chuck 211 is disposed parallel to the groove 112, and the second knob 22 moves outwards so that the chuck 211 is released from the groove 112 to unlock the arc adjuster 11.

In one embodiment, the strainer 20 further comprises a fixing seat 23 fixedly connected with the second shell 40 and a handle 24 screwed connected with the fixing seat 23; when locking, the handle 24 is rotated so that the handle 24 moves outward relative to the fixing seat 23 until the handle 24 is against the second knob 22 to tighten the adjusting rod 21 and lock the arc adjuster 11; when unlocking, the handle 24 is rotated in the opposite direction, so that the handle 24 moves inward relative to the fixing seat 23 until the handle 24 is separated from the second knob 22 to release the adjusting rod 21, thereby unlocking the arc adjuster 11.

In one embodiment, a spring 25 is sleeved on the adjusting rod 21, and both ends of the spring 25 are respectively abutted with the second knob 22 and the handle 24. The spring 25 acts to reset the second knob 22.

Figure 10:
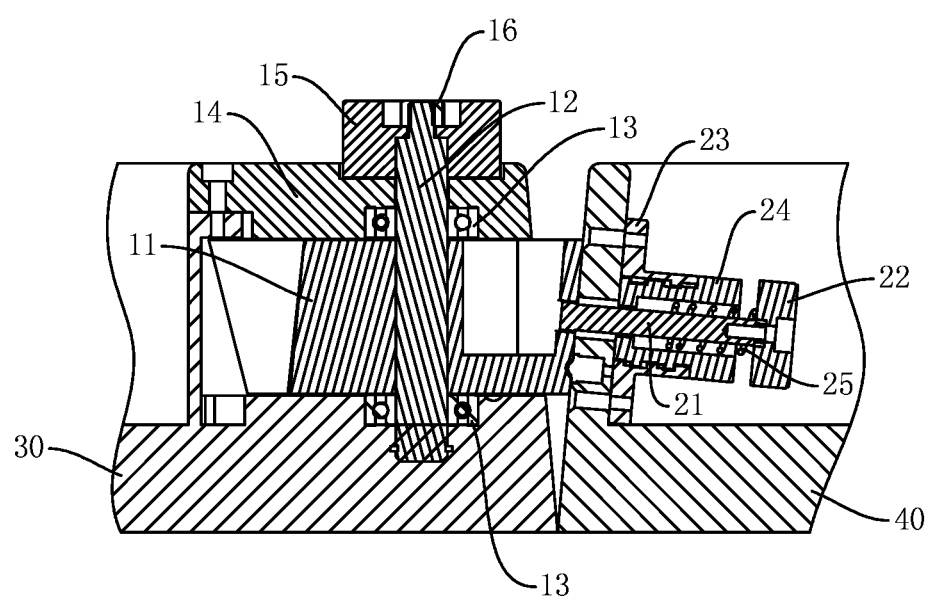
FIG. 10 is a schematic diagram of an unlocked state of a one-side rotating arc lock provided by an embodiment of the present invention.
Figure 11:
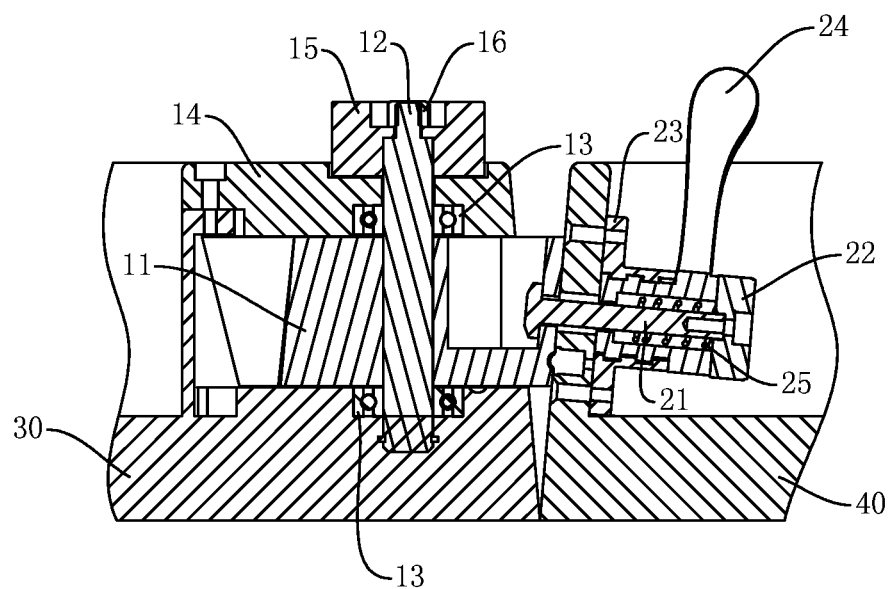
FIG. 11 is a schematic diagram of a locked state of a one-side rotating arc lock provided by an embodiment of the present invention.

The operation method of the one-side rotating arc lock of the present invention is as follows: as shown in FIG. 11, when locking, the second knob 22 is pressed, so that the chuck 211 passes through the groove 112, and the second knob 22 is rotated, so that the chuck 211 and the groove 112 are alternately disposed, and then the handle 24 is rotated, so that the handle 24 is moved relative to the fixing seat 23 until the handle 24 and the second knob 22 collide to tighten the adjusting rod 21, thereby locking the arc adjuster 11; As shown in FIG. 10, when unlocking, the handle 24 is rotated in the opposite direction, so that the handle 24 is moved inward relative to the fixing seat 23 until the handle 24 is separated from the second knob 22 to release the adjusting rod 21 and the second knob 22 is pressed and rotated so as to make the chuck 211 parallel to the groove 112, and the second knob 22 is released, so that the second knob 22 moves outward under the force of the spring 25, and the chuck 211 escapes from the groove 112, thereby unlocking the arc adjuster 11.

The above contents are merely preferred embodiments of the present invention. For those skilled ordinary technicians in the filed, the embodiments of the present invention will have changes in specific implementation manners and application ranges. The content of the present specification should not be construed as a limitation to the present invention.

What is claimed is:

1. A one-side rotating arc lock, wherein the one-side rotating arc lock comprises an adjusting assembly arranged on a first shell and a strainer arranged on a second shell, the adjusting assembly comprises an arc adjuster rotatably connected with the first shell, and a first knob for adjusting the rotation angle of the arc adjuster, the arc adjuster is provided with multiple protrusions in the circumferential direction, which are used for adjusting the angle between the first shell and the second shell, grooves are provided on the protrusions, the strainer comprises an adjusting rod that cooperates with the groove for locking the first shell and the second shell; the strainer further comprises a fixing seat fixedly connected with the second shell and a handle screwed with the fixing seat; an end of the adjusting rod is provided with a chuck, and another end of the adjusting rod is provided with a second knob;

when locking, press the second knob so that the chuck passes through the groove, and the second knob is rotated, so that the chuck and the groove are alternately arranged to lock the arc adjuster, then rotate the handle so that the handle moves outward relative to the fixing seat until the handle is against the second knob to tighten the adjusting rod and lock the arc adjuster; when unlocking, rotate the handle in the opposite direction, so that the handle moves inward relative to the fixing seat until the handle is separated from the second knob to release the adjusting rod, then rotates the second knob so that the chuck is disposed parallel to the groove, and the second knob moves outwards so that the chuck is released from the groove to unlock the arc adjuster.

2. The one-side rotating arc lock according to claim 1, wherein the number of the protrusions is nine, the nine protrusions are uniformly arranged along the circumferential direction of the arc adjuster, and the radial lengths of the nine protrusions gradually increase along the circumferential direction of the arc adjuster.

3. The one-side rotating arc lock according to claim 1, wherein the arc adjuster is rotatably connected with the first shell through a rotating shaft, and the rotating shaft is sleeved with bearings on both upper and lower ends of the arc adjuster.

4. The one-side rotating arc lock according to claim 3, wherein the first shell is provided with a receiving groove for mounting the arc adjuster, and an upper portion of the receiving groove is provided with a cover plate.

5. The one-side rotating arc lock according to claim 4, wherein the rotating shaft is provided at an upper part of the cover plate with the first knob and a nut for fixing the first knob.

6. The one-side rotating arc lock according to claim 1, wherein a spring is sleeved on the adjusting rod, and both ends of the spring are respectively abutted with the second knob and the handle.

* * * * *